Patented Aug. 29, 1950

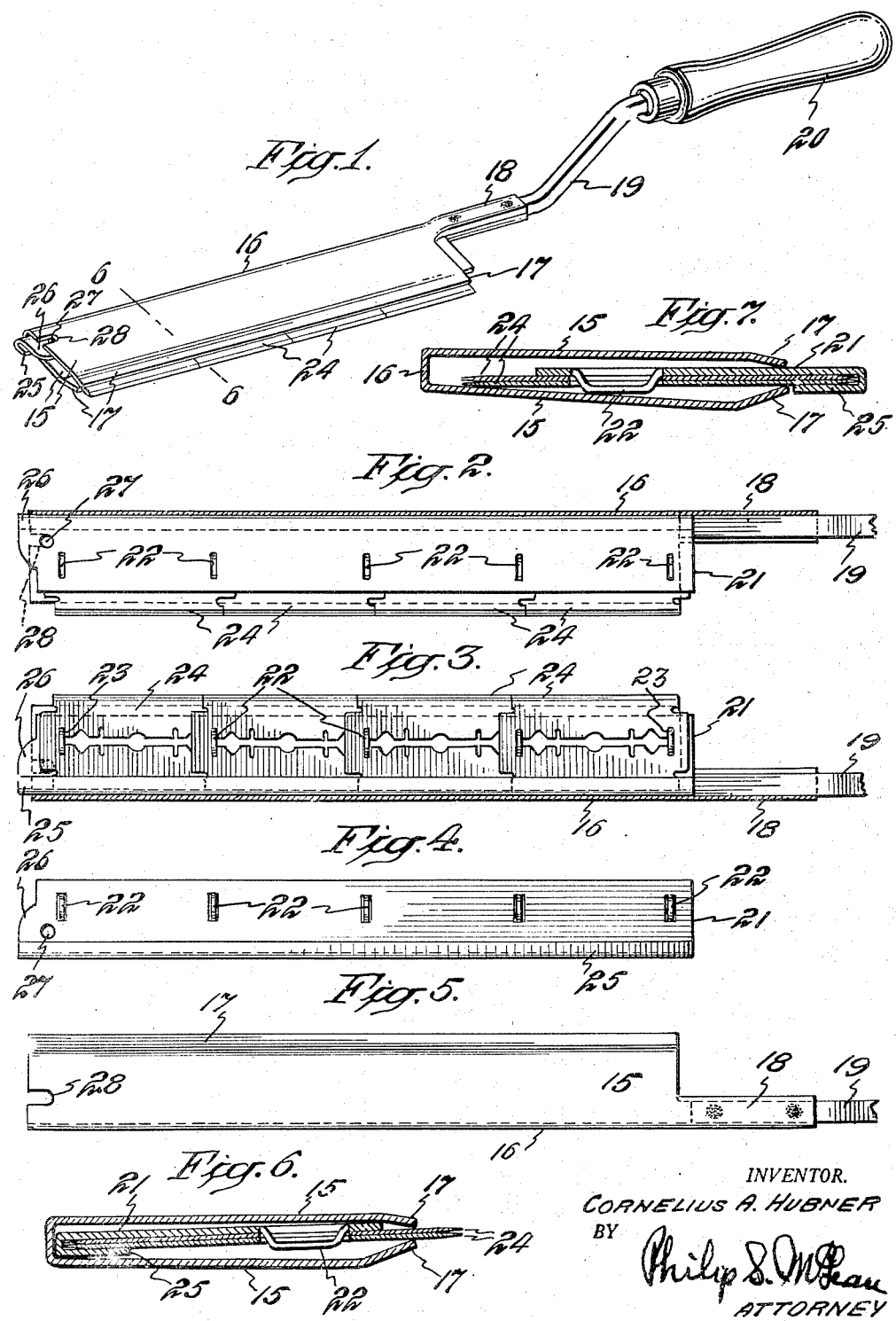

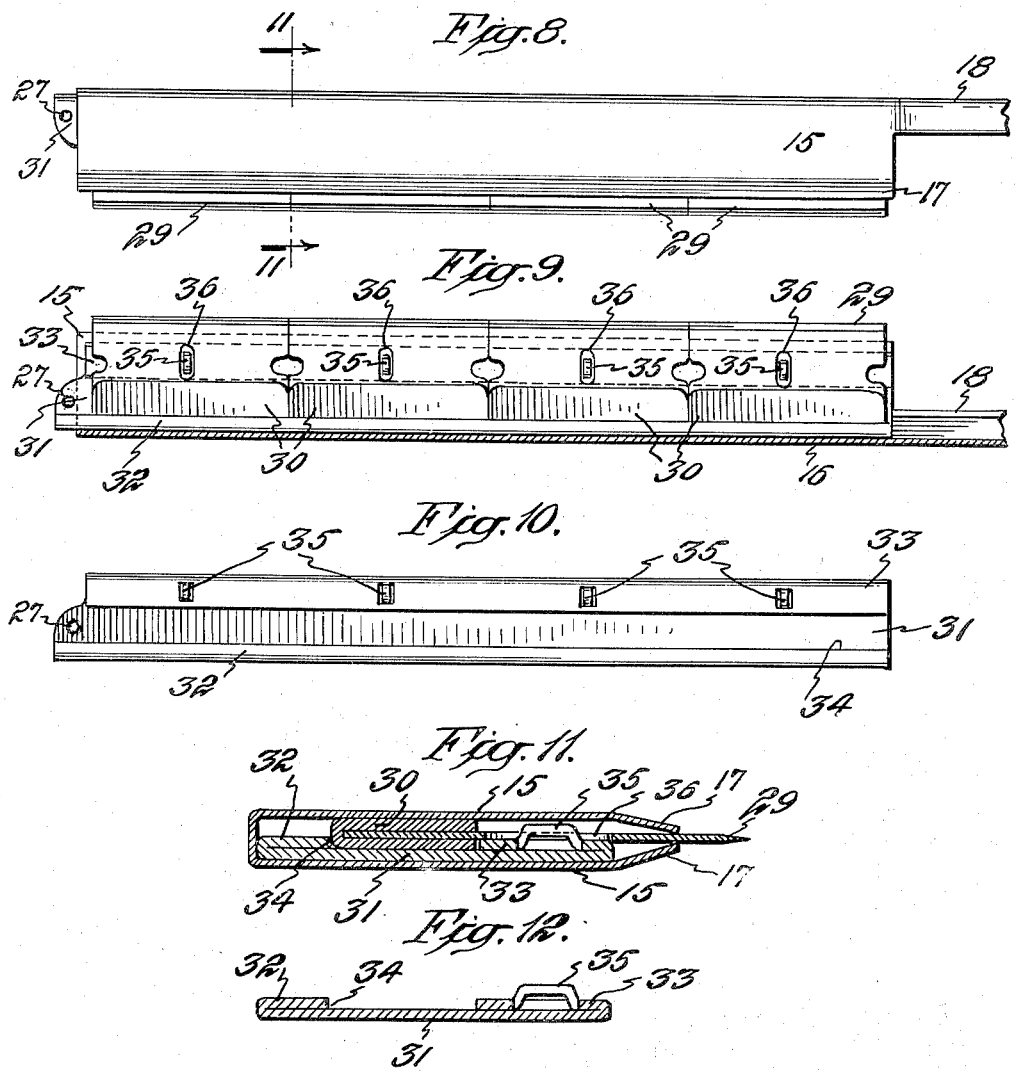

2,520,464

UNITED STATES PATENT OFFICE 2,520,464

GRASS CUTTING IMPLEMENT

Cornelius A. Hubner, Butler, N. J.

Application March 5, 1949, Serial No. 79,831

3 Claims. (Cl. 30—299)

The invention here disclosed is a tool for cutting and trimming grass and for this general type of work about lawns, flower beds and the like.

Special objects of the invention are to provide an implement of this type which will utilize razor blades to provide the cutting edge and to enable these blades to be safely handled in mounting them in the first place, and in removing them when they are ready to be discarded.

Particularly it is a purpose of the invention to enable the blades to be quickly and easily inserted in and removed from the handle or holder forming portion of the device.

Other special objects of the invention are to provide a cutter of the character indicated, of practical and efficient design and which will be of relatively inexpensive construction.

A further special purpose of the invention is to provide a construction in which the blades may be quickly and easily replaced and supported in the holder structure with the cutting edges covered and guarded, making the tool entirely safe for handling when thus conditioned for non-use.

Other desirable objects and the novel features of construction, combination and relation of parts through which the purposes of the invention are attained are set forth or will appear in the course of the following specification.

The drawings accompanying and forming part of the specification illustrate certain present practical embodiments of the invention. Structure, however, may be modified and changed as regards the immediate illustration, all within the true intent and broad scope of the invention as hereinafter defined and claimed.

Fig. 1 in the drawings is a perspective view of one embodiment of the invention;

Fig. 2 is a broken enlarged plan view with the back portion of the holder appearing in section;

Fig. 3 is a similar view showing the reverse side of the blade carrying slide in the holder, the back of the holder in this case also appearing in section;

Fig. 4 is a detached view of the blade holding slide;

Fig. 5 is a bottom view of the holder with the handle portion broken away;

Fig. 6 is an enlarged cross sectional view as on substantially the plane of lines 6—6 of Fig. 1;

Fig. 7 is a similar view with the slide shown reversed in the holder to locate the cutting edges in protected relation within the hollow back of the holder;

Fig. 8 is a broken plan view of a form of the invention designed for using single edged blades;

Fig. 9 is a broken longitudinal sectional view of the same;

Fig. 10 is a detached plan view of the slide for carrying the single edged blades;

Fig. 11 is an enlarged cross sectional view on substantially the plane of line 11—11 of Fig. 8;

Fig. 12 is a cross sectional detail of the slide.

In both forms of the invention shown the holder consists of a pair of continuous, substantially parallel spring blades or jaws 15 held in closely spaced relation by a more or less rounded back portion 16 and having continuous, convergent, blade clamping free edges 17.

The spaced jaw members 15 are shown as open at both ends for free admission of the blade carrying slide and as having at one end a tubular handle extension 18 in which is shown secured an angled handle rod 19 provided with a hand grip 20.

The holder described, as a practical matter, may be made of a single piece of spring sheet metal cut and folded to the form indicated.

The blade holding slide may be constructed to carry either double edged or single edged razor blades.

In the first instance it consists of a single flat blade or strip 21 having upstruck lugs 22 punched thereon in spaced relation to enter the positioning openings 23 in the double edged blades 24 when arranged in the overlapping end relation illustrated in Fig. 3.

Also, the securing and positioning lugs 21 are so located on the slide as to hold the blades with the aligned cutting edges at one side projecting beyond the edge of the slide and the aligned cutting edges at the opposite side disposed behind the flange 25 turned over at the opposite edge of the slide. This turned-over edge provides longitudinal reinforcement for the slide as well as a cover for the extra cutting edges not in actual service.

As shown in Fig. 6, the spacing of the spring jaws 15 is sufficient to freely admit the folded, back or inner edge of the slide and the blade locating projections 22, and the convergence of the free edges of the spring jaws at 17 is sufficient to enable these edges to firmly grip the opposite sides of the projecting portions of the blades.

In use the double edged blades 23 may first be placed on the slide 21 in the arrangement shown in Fig. 3, with adjoining ends in the overlapping relation, engaged over the positioning and holding lugs 22, and the slide with attached blades then be slid endwise into the outer end of the holder between the spring clamping jaws 15.

In the final position shown in Figs. 1, 2 and 3, the slide and the blades will be firmly gripped between the spring clamping jaws with the outward edges of the blades exposed and the inward edges protected behind the over-turned guard flange 25 of the slide.

In this condition, as will be clear from Fig. 1, the tool may be used with a shaving stroke to cut and trim grass and weeds and in particular, to reach into closely confined spaces for effecting such trimming operations.

When the blades are dulled the slide may be readily removed as by pulling on the outer, exposed end of the slide at 26 and the slide may be provided at this end with an opening 27 for engagement over a nail or to receive the end of a hook or tool for pulling the slide out of the holder.

Also, it may be convenient to provide slots 28 in the jaws of the holder to expose the pulling opening 27 in the slide, so that with the slide fully seated in the holder there will still be exposed a means for effecting engagement with the end of the slide for pulling it out of the holder.

To make the tool entirely safe for storage or packing or the like, the parts are so designed and arranged that the slide with the blades mounted thereon may be reversed, edge-for-edge, and replaced back in the holder with the cutting edges of the blades faced inwardly and the overturned guard flange 25 at the outside, as shown in Fig. 7. In this relation the implement may be safely handled, with the cutting edges inside the holder and the guard flange of the slide serving as an exposed grip or handle for slipping the cutter portion out of the holder preparatory to reversing and replacing it into position for use in the manner described.

As shown in Figs. 8 to 12, the slide may be constructed for mounting single edged blades 29 having folded reinforcing backings 30 by folding opposite edges of the slide, in this case numbered 31, at 32, 33, to provide between them a space 34 for the reinforcement 39 and by striking out the positioning lugs 35 on the forward edge flange 33 to extend through the positioning openings 36 usually formed in such single edged blades.

In this case, as shown in Fig. 9, the blades may be located in abutting end-to-end engagement on the slide. In such abutting end-to-end engagement the blades may collectively take up additional length. The holder, therefore, may be made long enough to take either the slide for the overlapping double edged blades first shown, or the slide for the end-to-end abutting blades last considered.

Both forms of construction are particularly simple and durable and entirely practical for the purposes intended.

What is claimed is:

1. A grass cutting implement of the character disclosed comprising an elongated, flat holder having cooperative, oppositely disposed spring clamping jaws connected at the back in closely spaced relation and having free edges spring tensioned toward each other at the front, said holder being open at one end and having an extended operating handle at the opposite end, a flat, blade carrying slide longitudinally insertable into the open end of said holder in the space between said closely spaced jaws, said slide having longitudinally spaced projecting lugs adjoining one longitudinal edge of the same, razor blades in longitudinally aligned relation on the face of said slide with their cutting edges projecting beyond the edge of the slide and having positioning openings engaged over said projecting lugs and whereby said blades are located and held on the slide with the cutting edges projecting beyond the edge of the slide and said slide with the blades definitely positioned thereon being insertable longitudinally in the open end of the holder between said spring clamping jaws and with the cutting edges projecting from the slide between and beyond the spring tensioned, free edges of said clamping jaws.

2. The structure defined in claim 1, in which the opposite longitudinal edge of the slide is turned over to form a guard for the opposite edges of the blades positioned on the slide and in which the slide is completely reversible edge-for-edge in the holder with said overturned guard edge of the slide at the outside of the holder and providing a finger grip by which the slide and blades thereon may be slid endwise into and out of the holder.

3. The structure defined in claim 1, in which the slide has opposite longitudinal edge flange portions of the same overturned over the face of the same and spaced from each other to form between them a longitudinally extending seat on the slide, the blades having reinforced backs engaged in said longitudinally extending seat and said projecting lugs being struck up from one of said overturned edge flange portions of the slide.

CORNELIUS A. HUBNER.

REFERENCES CITED

The following references are of record in the file of this patent:

UNITED STATES PATENTS

| Number | Name | Date |
|---|---|---|
| 1,548,513 | Day | Aug. 4, 1925 |
| 1,685,703 | Clark | Sept. 25, 1928 |

FOREIGN PATENTS

| Number | Country | Date |
|---|---|---|
| 629,343 | Germany | Apr. 28, 1836 |